(12) United States Patent
Klinger et al.

(10) Patent No.: US 12,467,796 B2
(45) Date of Patent: Nov. 11, 2025

(54) THERMAL PROBE ASSEMBLY

(71) Applicant: COOPER-STANDARD AUTOMOTIVE INC, Northville, MI (US)

(72) Inventors: Gary O Klinger, Rochester Hills, MI (US); Brian J. Cardwell, Ypsilanti, MI (US); Christian A. Veraza, Auburn Hills, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 450 days.

(21) Appl. No.: 17/969,121

(22) Filed: Oct. 19, 2022

(65) Prior Publication Data

US 2023/0213393 A1     Jul. 6, 2023

Related U.S. Application Data

(60) Provisional application No. 63/295,099, filed on Dec. 30, 2021.

(51) Int. Cl.
*G01K 1/14*     (2021.01)
*G01K 7/22*     (2006.01)
*G01K 13/02*    (2021.01)

(52) U.S. Cl.
CPC ............... *G01K 1/14* (2013.01); *G01K 7/22* (2013.01); *G01K 13/026* (2021.01)

(58) Field of Classification Search
CPC .......... G01K 1/14; G01K 13/026; G01K 7/22; G01K 13/00; G01K 13/02; G01K 1/16;

(Continued)

(56) References Cited

U.S. PATENT DOCUMENTS 2,750,483 A * 6/1956 Voorman, Jr. ............ G01K 7/18
374/185
4,385,197 A * 5/1983 Schwagerman ....... G01K 1/026
374/E1.005

(Continued)

FOREIGN PATENT DOCUMENTS

DE       10109828 A1 *  9/2002 ............... G01K 1/12
EP         525557 A1 *  2/1993 ............... G01K 1/10
FR        2863705 B1 * 12/2003

OTHER PUBLICATIONS

17969121_2025-02-10_DE_10109828_A1_H.pdf,Sep. 5, 2002.*

*Primary Examiner* — Peter J Macchiarolo
(74) *Attorney, Agent, or Firm* — Paschall & Associates, LLC; James C. Paschall; Anthony Miologos

(57) ABSTRACT

An assembly of a thermal probe and a probe fitting arranged to measure the temperature of a fluid medium flowing in a passage of the probe fitting. The assembly comprises a temperature sensing assembly that produces a resistance which varies with the temperature. A connector assembly that is connected to the temperature sensing assembly that transmits the resistance to external circuitry. A non-metallic housing includes a sensor portion incasing the temperature sensing assembly and a connector portion housing the connector assembly. A probe receptacle attached to the probe fitting is arranged to receive the sensor portion of the thermal probe, positioning the temperature sensing assembly in the passage to sense the temperature of the fluid medium flowing in the passage.

19 Claims, 9 Drawing Sheets

(58) Field of Classification Search
CPC .......... G01K 7/16; G01K 13/024; G01K 1/02; G01K 2205/04; G01K 1/08; G01K 13/25
USPC ........ 374/163, 185, 208, 141, 13.006, 1.011, 374/1.02, 194
See application file for complete search history.

(56) References Cited

U.S. PATENT DOCUMENTS

| | | | | |
|---|---|---|---|---|
| 4,842,419 A * | 6/1989 | Nietert | ...................... | G01K 7/22 374/185 |
| 5,046,857 A * | 9/1991 | Metzger | ................... | G01K 7/16 374/185 |
| 5,449,234 A * | 9/1995 | Gipp | ...................... | G01K 13/02 374/185 |
| 5,456,500 A * | 10/1995 | Klinger | ............... | F16L 37/0987 285/921 |
| 5,533,761 A * | 7/1996 | Ostrander | ........... | F16L 37/0982 285/308 |
| 5,741,072 A * | 4/1998 | Yamaguchi | ............ | G01K 7/023 136/235 |
| 5,844,135 A * | 12/1998 | Brammer | ................ | G01K 1/08 73/114.34 |
| 6,435,017 B1 * | 8/2002 | Nowicki, Jr. | ....... | G01L 19/0007 73/114.18 |
| 6,536,273 B2 * | 3/2003 | Schrittenlacher | ....... | G01F 1/699 73/204.11 |
| 7,147,369 B2 * | 12/2006 | Gadonniex | ............ | G01K 13/02 374/185 |
| 9,841,335 B2 * | 12/2017 | Rueth | ....................... | G01L 9/00 |
| 10,156,480 B2 * | 12/2018 | Bauschke | ................ | G01K 1/08 |
| 10,247,615 B2 * | 4/2019 | Martinez | .................. | G01K 1/08 |
| 11,422,038 B2 * | 8/2022 | Fernandes | ................ | G01K 7/22 |
| 11,774,272 B2 * | 10/2023 | Furey | ..................... | G01D 11/30 73/866.5 |
| 12,098,960 B2 * | 9/2024 | Kopp | ....................... | G01K 1/14 |
| 2005/0175066 A1 * | 8/2005 | Nakabayashi | ......... | G01K 13/02 374/208 |
| 2006/0215731 A1 * | 9/2006 | Gadonniex | .............. | G01K 1/16 374/185 |
| 2007/0121701 A1 * | 5/2007 | Gennissen | .......... | G01L 19/0092 374/E13.006 |
| 2008/0205481 A1 * | 8/2008 | Faries | .................... | G01K 1/146 374/138 |
| 2009/0323761 A1 * | 12/2009 | Tsai | ...................... | G01K 13/02 374/E13.006 |
| 2018/0038741 A1 * | 2/2018 | Krishnamurthy | ........ | G01K 7/22 |
| 2023/0027286 A1 * | 1/2023 | Veraza | .................... | F16L 37/098 |
| 2023/0213393 A1 * | 7/2023 | Klinger | .................... | G01K 1/08 374/185 |
| 2023/0296450 A1 * | 9/2023 | Nakamura | ............... | G01K 1/16 374/100 |

* cited by examiner

THERMAL PROBE ASSEMBLY

CROSS-REFERENCE TO RELATED APPLICATION AND PRIORITY CLAIM

This application claims priority under 35 U.S.C. § 119(e) to U.S. Provisional Patent Application No. 63/295,099 filed on Dec. 30, 2021. This provisional application is hereby incorporated by reference in its entirety.

TECHNICAL FIELD

This disclosure is generally directed to thermal probes. More specifically, it relates to a thermal probe assembly having a temperature sensing device packaged within a non-metallic housing that can be removably installed in a probe receptacle.

BACKGROUND

Thermal probes have numerous applications such as engine coolant sensors in vehicles powered by internal combustion engines or battery coolant sensors in electric vehicles. Traditionally, most thermal probes used in vehicles have taken the form of sensing elements such as for example thermostats having switched outputs. However, with the advent of complex electronic engine or cooling controllers, it is desirable to provide an absolute indication of the sensed temperature rather than merely a switched output.

Modern thermal probes typically incorporate passive devices such as thermistors, negative thermal coefficient devices (NTC) or positive thermal coefficient (PTC) devices. The output of these passive sensor devices is typically in the form of a resistance which varies with temperature. A vehicles engine cooling system is a harsh environment due to the corrosive behavior of the fluids used and the temperature extremes. Additionally, due to the external conditions experienced by a vehicle, such as for example, water and moisture, thermal cycle, and vibration can lead to a degradation of the wiring connectors used to connect the thermal probe to the engine or cooling controller. For example, moisture and humidity can induce conductivity between individual wires in the wiring connector of the thermal probe components and over time the resistance of the individual wires can change. Such wiring connector degradation can induce inaccuracies in the signal received by the engine controller.

Past thermal probes suffer from further disadvantages because they are typically constructed with metal housings. Known devices involve fitting the temperature sensing device into a housing constructed of brass or other similar metals. The housing typically includes an exterior thread and a hexagonal portion enabling the device to be screwed into a reciprocal threaded aperture in for example, an engine block or a fitting adapted to receive the exterior threads in a coolant line. Sensing devices having metal housings have disadvantageous do to the relatively high costs associated with machining parts and the time-intensive assembly process.

In other known thermal probes, the temperature sensing device is positioned in a two-piece housing that has a metallic component that is either machined or stamped and a separately molded plastic connector component. The plastic connector component is connected to the brass component using various methods. Typically, a gasket seals the interface or joint between the brass component and the plastic connector component. After assembly of the housing, the temperature sensing device is typically inserted into the housing and secured in place. A further significant disadvantage of metal housings, and particularly those formed with a hexagonal nut portion, is that the metal acts as a heat sink and draws the heat away from the sensing element thereby causing inaccurate temperature readings.

SUMMARY

This disclosure relates to a thermal probe assembly having a temperature sensing device packaged within a non-metallic housing that can be removably installed in a probe receptacle.

In a first embodiment, a thermal probe for sensing a temperature is disclosed comprising a temperature sensing assembly that produces a resistance which varies with temperature. A connector assembly connected to the temperature sensing assembly is adapted to transmit the resistance to external circuitry. A non-metallic housing incases the temperature sensing assembly and the connector assembly.

In a second embodiment an assembly of a thermal probe and a probe fitting is disclosed for measuring the temperature of a fluid medium flowing in a passage of the probe fitting. The assembly comprises a temperature sensing assembly that produces a resistance which varies with the temperature. A connector assembly is connected to the to the temperature sensing assembly and is adapted to transmit the resistance to external circuitry. A non-metallic housing incases the temperature sensing assembly and a connector portion houses the connector assembly. A probe receptacle is attached to the probe fitting and is adapted to removably receive the sensor portion of the housing, positioning the temperature sensing assembly in the passage to sense the temperature of the fluid medium flowing in the passage.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
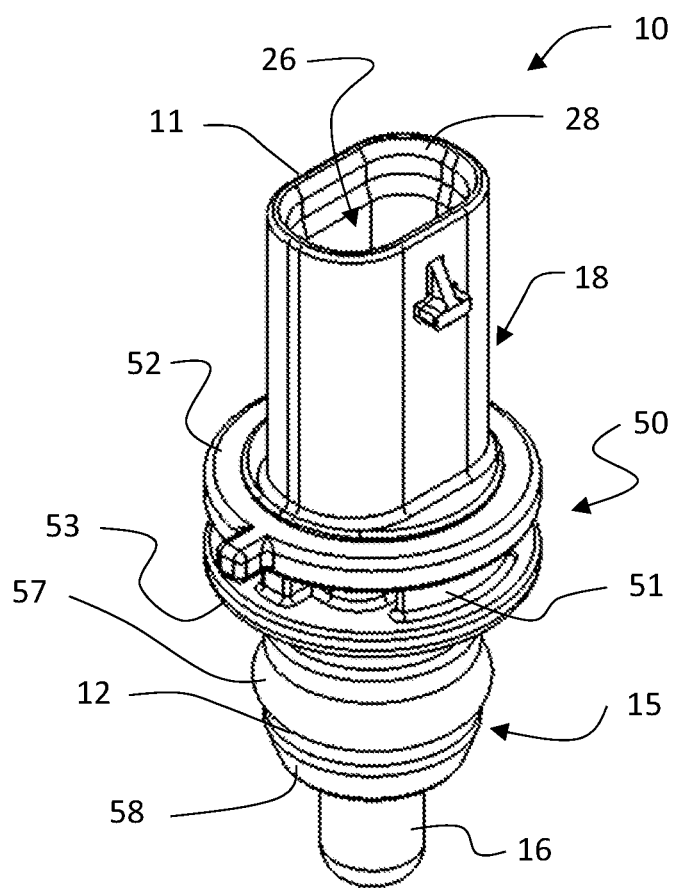
FIG. 1 is a perspective view of an exemplary embodiment of the thermal probe of the present disclosure.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

A thermal probe is provided which includes a temperature sensitive device having an electrical resistivity which varies with temperature connected to at least one electrical connector assembly. The electrical connector assembly is arranged to be electrically connected to the temperature sensitive device and adapted to provide an output signal to a measurement device connected to the electrical connector assembly that measures the resistance across the temperature sensitive device responsive to the sensed resistance.

FIGS. 1-4 illustrate the thermal probe 10 of the present embodiment. The thermal probe 10 includes a liquid resistant, non-metallic housing 11 which incases a temperature sensing assembly. The housing 11 includes a sensor portion 15 that includes a sensor tip 16 located at the end of the housing 11 opposite a connector portion 18. The entire housing 11 is formed using an appropriate thermoplastic material applicable to withstand the chemical compositions and temperatures that the thermal probe 10 will be exposed to, such as for example, a polyethersulfone material infused with glass fibers. In the case of a coolant sensor for an internal combustion engine, the main design criteria is that the housing 11 provide adequate chemical resistance to ethylene-glycol mixtures which are used in engine coolants. Other materials having the characteristics of polyethersulfone, such as polyphthalimde, may also be used to form the housing 11. Synthetic polymers or polyamides such as nylon 6 or nylon 6,6 may be used to form the housing 11 in water based, or low-temperature coolants typically used in battery cooling applications for electric vehicles.

The sensor portion 15 of the housing 11 includes a mounting assembly, seen generally at 50, used to secure the thermal probe 10 in a probe receptacle 71. The mounting assembly is comprised of an upper flange member 52 and a lower flange member 53 defining an annular channel 51 therebetween. The channel 51 cooperates with a suitable locking clip 90 to retain the thermal probe 10 in the probe receptacle 71, which will be explained in more detail below.

Figure 3:
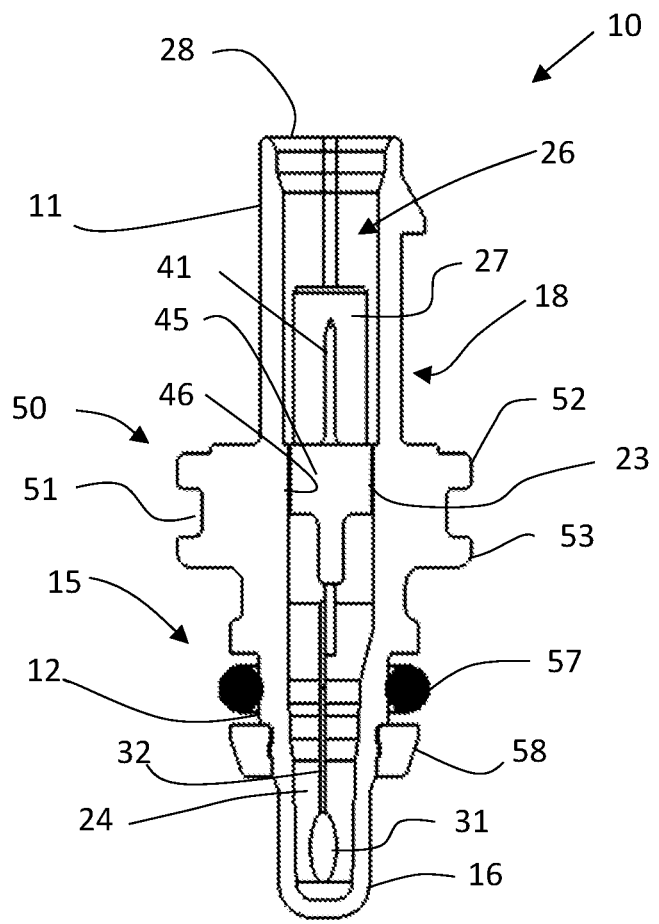
FIG. 3 is a sectional view along section line A-A of FIG. 2 of the exemplary embodiment of the thermal probe of the present disclosure.

As shown in FIGS. 1 and 3 an outer surface 12 of the sensor portion 15 includes a first sealing element 57 located circumferentially about the outer surface 12 of the housing 11. The first sealing element 57 may be comprised from for example, an O-ring formed from an ethylene propylene diene terpolymer (EPDM) rubber material. A spacer-cap 58 is generally shaped as an inverted truncated cone that is locked on outer surface 12 of the housing below the first sealing element 57. The spacer-cap 58 functions as a bore pilot to properly position the sealing element 57.

In the exemplary embodiment the housing 11 is formed in one-piece using an injection molding process that forms both the sensor portion 15 and connector portion 18 as a single unit or piece that includes an interior chamber 26. The temperature sensing assembly is inserted into and secured within the chamber 26 after forming the one-piece housing 11. The interior chamber 26 extends inward into the housing 11 from an opening 28 through a connector cavity 27 of the connector portion 18 through housing 11 to a sensor cavity 24 at the sensor portion 15. The sensor cavity 24 is designed to receive the temperature sensing assembly.

Figure 4:
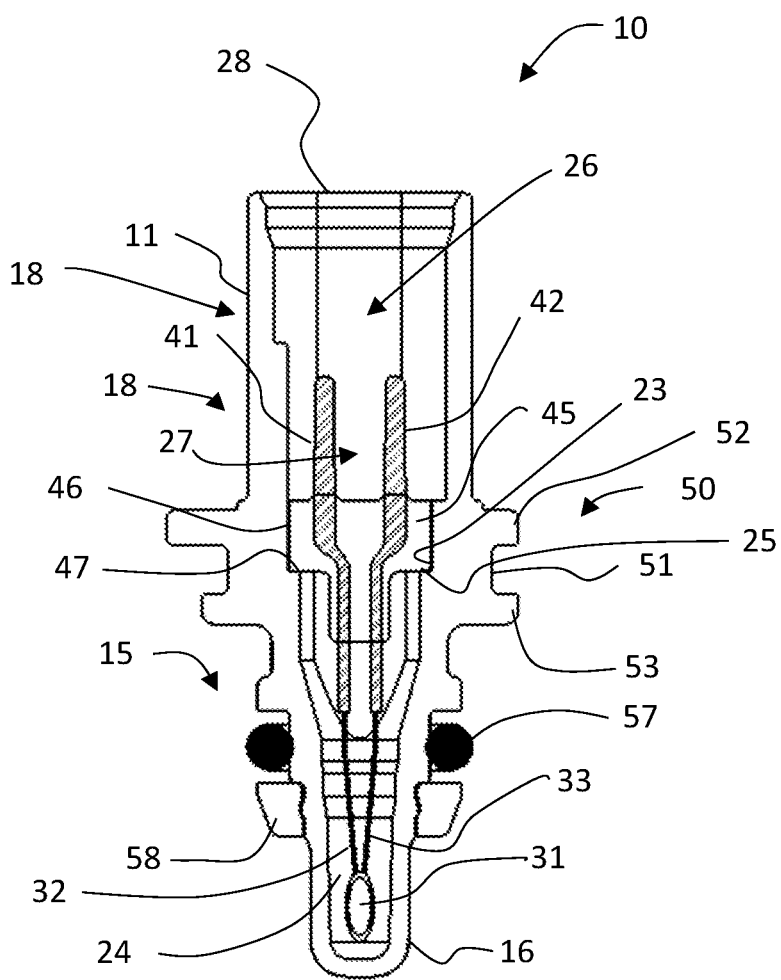
FIG. 4 is a sectional view along section line B-B of FIG. 2 of the exemplary embodiment of the thermal probe according to the present disclosure.

As is best seen in FIG. 4, the temperature sensing assembly is comprised of a temperature sensing device 31 and electrical leads 32, 33. The connector assembly is comprised of electrical terminals 41, 42 and a terminal base 45. The temperature sensing device 31 is arranged to have a parameter which varies with temperature. Preferably, the temperature sensing device 31 is in the form of a thermistor having an electrical resistance which varies with temperature. However, it should be understood that other suitable devices such as a negative temperature coefficient (NTC) device, a positive temperature coefficient (PTC) device, a thermocouple or a semiconductor device could be used to perform the function of the temperature sensing device 31 without departing from the scope of the invention. The temperature sensing device 31 has the electrical leads 32, 33 extending from device 31. The leads 32, 33 are in turn attached to electrical terminals 41, 42 of the connector assembly respectively, using any suitable means that makes a good mechanical and electrical connection between lead 32 and terminal 41, as well as lead 33 and terminal 43. For example, leads 32, 33 may be mechanically crimped to terminals 41, 42, laser welded or connected using a solder connection.

Figure 2:
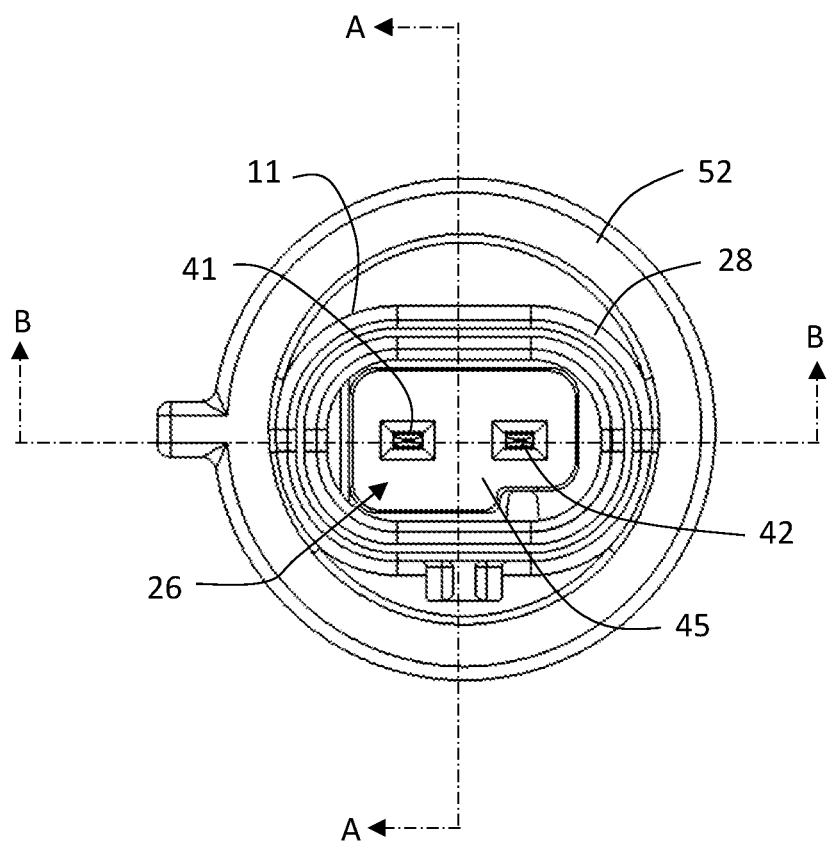
FIG. 2 is a top plan view of the exemplary embodiment of the thermal probe of the present disclosure.

As can be seen in FIGS. 2-4, terminals 41 and 42 extend through the terminal base 45 from an end facing the temperature sensing device 31 to an end facing connector opening 28. The terminals 41 and 42 extend into connector cavity 27 of the connector portion 18 of housing 11. The connector cavity 27 is arranged to accept a suitable terminal connector (not shown) through connector opening 28 to electrically connect the temperature sensitive assembly to an external electrical circuit such as an engine or cooling circuit controller. Electrical terminals 41, 42 form a circuit for transmitting current changes representing the temperature sensed by temperature sensing device 31. The circuit formed by terminals 41, 42 transmit the current changes as an output signal to the external electrical circuit through the terminal connector.

Electrical terminals 41, 42 extend through the terminal base 45. The terminals 41, 42 are installed in the terminal base by over molding the base 45 over terminals 41, 42 during manufacture. During assembly of the temperature sensing assembly are connected to the leads 32, 33 of the temperature sensing device 31. The temperature sensing device 31 and terminal base 45 are then inserted into the interior chamber 26 through connector opening 28. The terminal base 45 is inserted into chamber 26 until edges 47 of the base 45 contact and rest on stop surfaces 25 located in the chamber 26 between sensor cavity 24 and connector cavity 27, thereby stopping further insertion of the thermal sensing assembly 30 within housing 11. The terminal base 45 may be formed using a thermoplastic material or from a rubber compound.

Prior to assembly of the temperature sensing assembly into sensor cavity 24, a predetermined amount of potting material may be injected into sensor cavity 24 such as for example a silicone gel or epoxy gel. Insertion of the temperature sensing device 31 into the sensor cavity 24 forces the potting material around sensing device 31 and leads 32, 33. The potting material facilitates heat transfer between a fluid medium, the sensor tip 16 of housing 11 and the temperature sensing device 31. Conversely, if the sensor cavity 24 was left as an air gap, the air would act as an insulator and increase the sensing devices 31 response time.

The terminal base 45 is constructed so as to have side walls 46 of a shape and size slightly larger than the shape and size defined by interior walls 23 of interior chamber 26 proximate stop surfaces 25. When terminal base 45 is installed on stop surfaces 25 side walls 23 seal against interior walls 23 of chamber 26 preventing moisture infiltration past the terminal base 45 into sensor cavity 24. The terminal base 45 is held in position by a friction fit between side walls 46 of the terminal base 45 and the interior walls 23 of the chamber 26. It is foreseeable that the terminal base 45, could also be secured using a bonding material such as epoxy or an adhesive.

Figure 5:
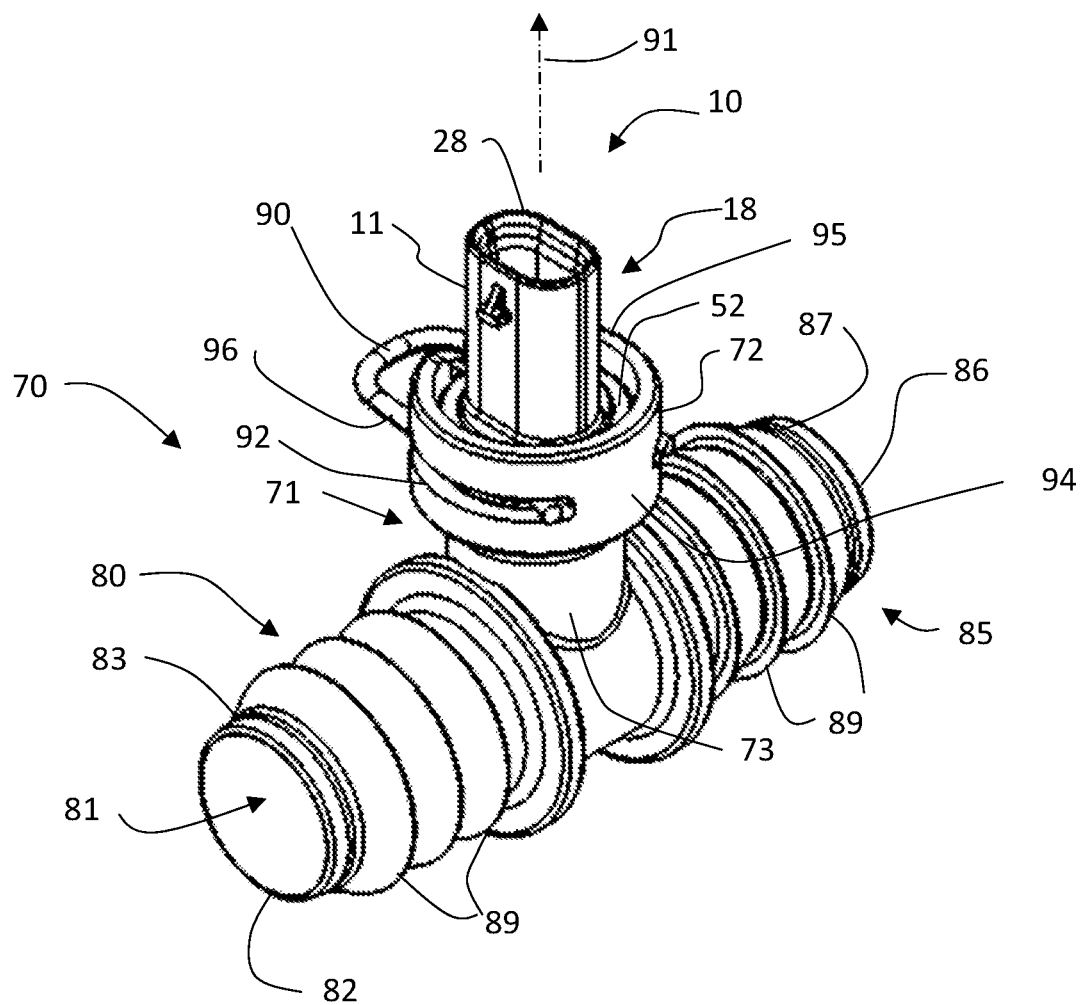
FIG. 5 is a perspective view of an exemplary embodiment of the assembly of the thermal probe with a probe fitting according to the present disclosure.
Figure 6:
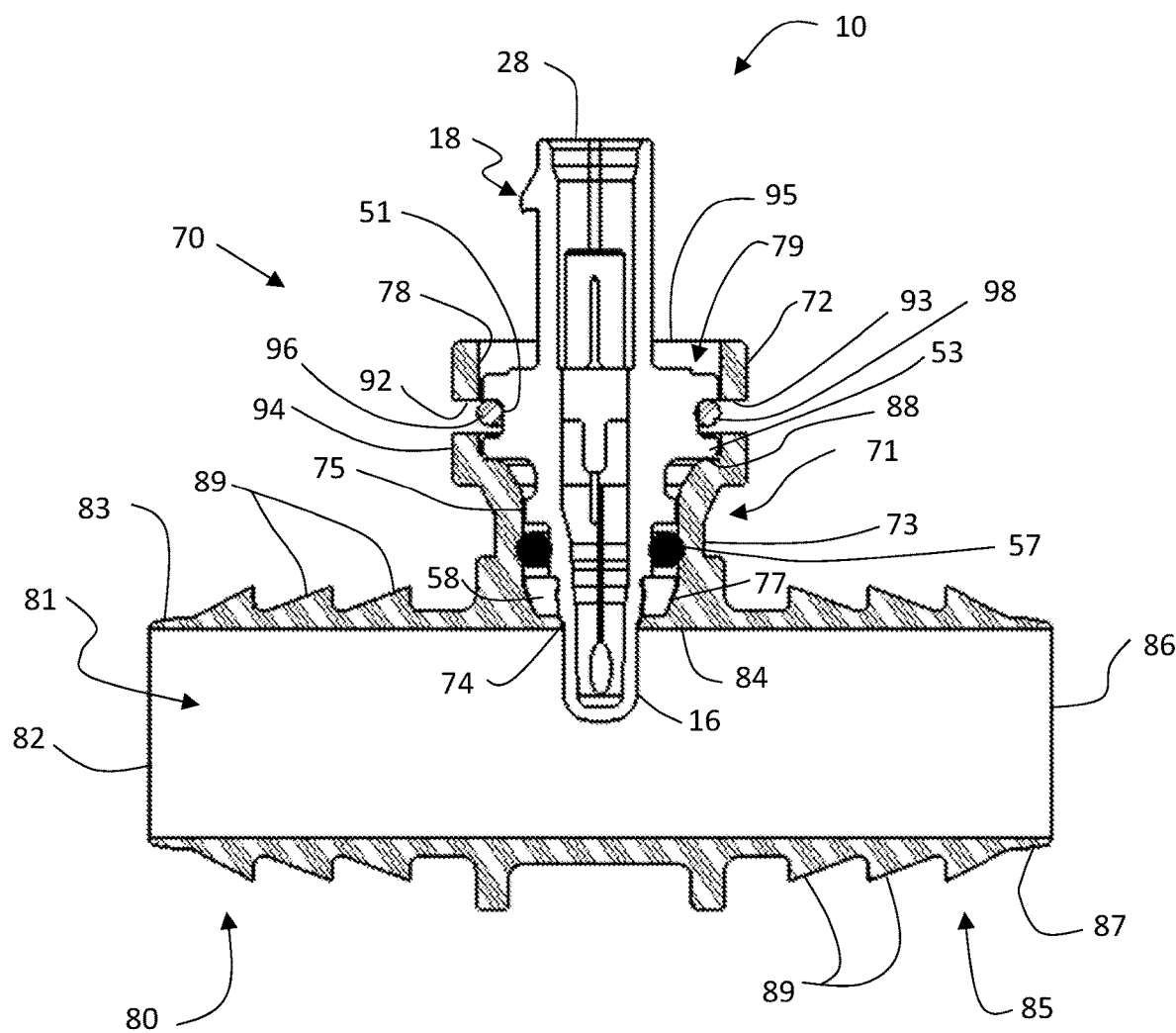
FIG. 6 is a longitudinal sectional view of the exemplary embodiment of FIG. 5 according to the present disclosure.
Figure 7:
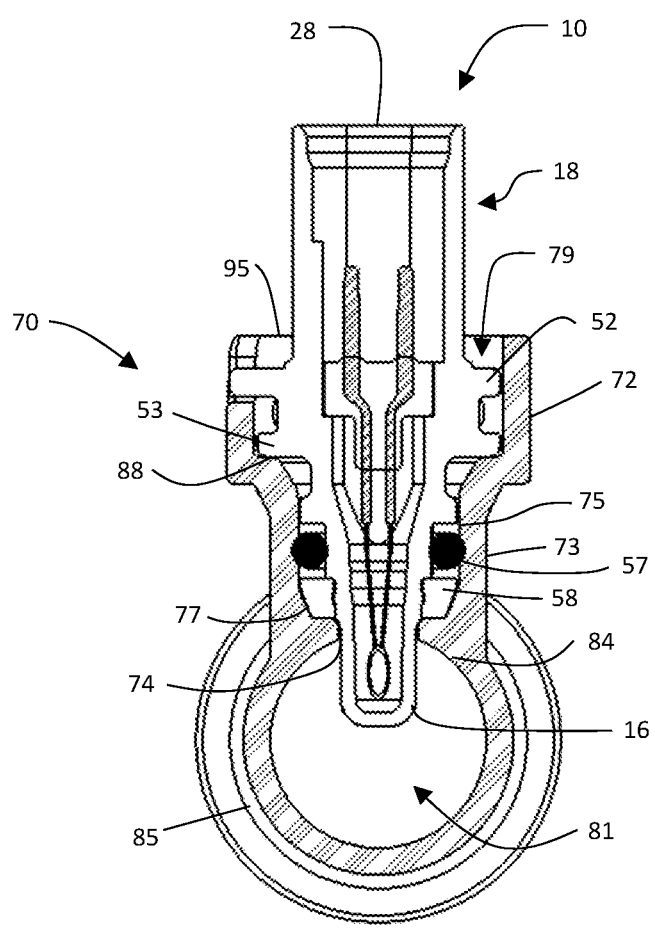
FIG. 7 is a lateral sectional view of the exemplary embodiment of FIG. 5 according to the present disclosure.

FIGS. 5-7 illustrate an example embodiment of a probe fitting 70 used to removably accept the thermal probe 10 shown and described in FIGS. 1-4. The probe fitting 70 includes a probe receptacle 71, centrally located between cylindrical first and second tube coupling ends 80, 85. A cylindrical passage 81 extends between an opening 82 located on a first stem portion 83 of the first tube coupling end 80 to an opening 86 located on a second stem portion 87 of the second tube coupling end 85. Both stem portions 83, 87 each include a plurality of flanges 89 extending outward from an exterior surface of stem portions 83, 87.

A first fluid tube (not shown) is arranged to be installed on the first stem portion 83 over flanges 89. Similarly, a second fluid tube (not shown) is arranged to be installed over the second stem portion 87 over flanges 89. Flanges 89 are arranged to retain each tube on its respective stem portion 83, 87 and make a fluid tight seal between the installed tubes and the fitting 70. With the first and second tubes installed on each coupling end 80, 85 a fluid medium can flow between the fluid tubes through openings 82, 86 and passage 81 either between the first to the second fluid tube or vice versa.

The probe receptacle 71 includes a generally cylindrical top hat portion 72 extending from a generally cylindrical bottom portion 73 that is integrally attached to probe fitting 70 between tube coupling ends 80, 85. An annular interior cavity 79 extends through receptacle 71 from an interior wall 78 of top hat 72 through the bottom portion 73 and to a circular hole 74. Hole 74 extends through wall 84 of probe fitting 70 into passage 81. The bottom portion 73 interior walls 75 of interior cavity 79 are tapered inward from the top hat portion 72 to the hole 74. The sealing element 57 has a diameter slightly larger than the interior wall 75 and arranged to elastically deform against interior wall 75. A ring-shaped bearing surface 77 is arranged to receive the spacer-cap 58 to pilot the sensor tip 16 to hole 74 and properly position the sealing element 57 to the perimeter of interior wall 75. With spacer-cap 58 installed in the bearing surface 77 the sealing element 57 is centrally positioned within cavity 79 equidistant to the perimeter of interior wall 75. This aids in properly positioning the sealing element 57 to make a uniform fluid tight seal circumferentially about the sealing element 57 and the interior wall 75. The hole 74 is sized to receive the thermal sensor tip 16 therethrough and allow the sensor tip 16 of housing 11 to extend into passage 81.

The interior wall 78 of top hat portion 72 is annularly shaped and sized to accept therein the mounting assembly 50 of the thermal probe 10. An annular shoulder 88 is formed within the interior walls 78 arranged to have a bottom surface of the lower flange 53 rest on shoulder 88. First and second slots 92, 93 extend through an exterior wall 94 of top hat portion 72. Slot 92 is adapted to receive therethrough a leg 96 of locking clip 90 and slot 93 a leg 98 of the locking clip. Each leg 96, 98 extending through its respective slot 92, 93 to be accepted within channel 51 of the mounting assembly 50. The locking clip 90 locks the thermal probe within probe receptacle 71 preventing the thermal probe 10 from being removed from the probe receptacle 71 in the direction shown by arrow 91.

The fitting 70 is formed using an appropriate thermoplastic material as a unitary structure using an injection molding process applicable to withstand the chemical compositions and temperatures that the fitting 70 will be exposed to, much in the same manner as was explained above for the thermal probe 10. The clip 90 can be composed of a single unitary structure from a rigid or semi-flexible thermoplastic, or from a suitable wire alloy, that would allow for insertion forces that can be made by an installers hand when installing legs 96, 98 of the clip 90 in channel 51 and also exhibit strong tensile strength to withstand any pressure applied to the thermal probe 10 by the fluid flowing in passage 81 of fitting 70.

As can be best seen in FIG. 6, the thermal probe 10 is installed into probe receptacle 71 by inserting the temperature sensing assembly through opening 95 and into interior cavity 79 and positioning sensor tip 16 to be installed through hole 74. With the sensor tip 16 extending through hole 74 sealing element 57 is positioned against interior wall 75 with the spacer-cap 58 resting within bearing surface 77. With the thermal probe 10 fully inserted into interior cavity 79, the bottom surface of lower flange member 53 of the mounting assembly 50 rests on shoulder 88 preventing further movement of the thermal probe 10 into probe receptacle 71. With lower flange member 53 resting on shoulder 88, slots 92, 93 are aligned with channel 51 of mounting assembly 50. Wire legs 96, 98 are installed within a respective slot 92, 93 to be captured within channel 51, locking the thermal probe 10 into probe receptacle 71. The sensor tip 16 extends into the fluid medium flowing in passage 81 to allow the temperature sensing device 31 to provide a reading of the temperature of the fluid as explained above.

The connector portion 18 of the thermal probe 10 extends outward from the top hat portion 72. Allowing the connector portion 18 to accept a suitable terminal connector (not shown) onto connector opening 28 to electrically connect to electrical terminals 41, 42, electrically connecting the temperature sensing device 31 to an external electrical circuit such as an engine or cooling controller as explained above.

The thermal probe 10 may be removed from the probe receptacle 71 by backing out the clip 90 and each leg 96, 98 from channel 51 and slots 92, 93 of the top hat portion 72 allowing the thermal probe 10 to be pulled out of the internal cavity 79 through the opening 95.

Figure 8:
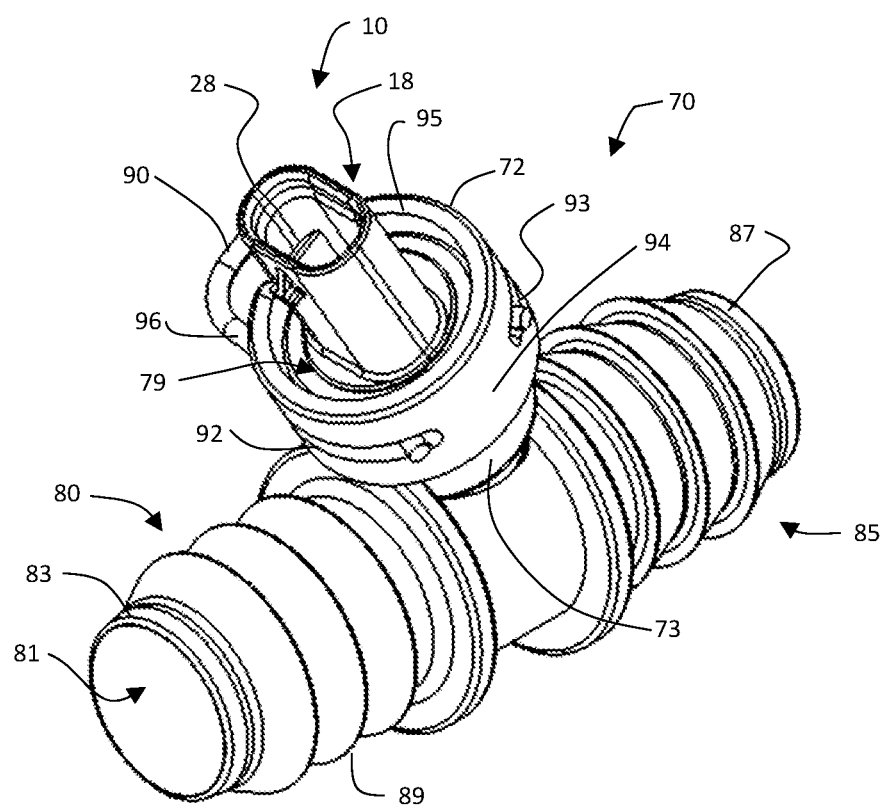
FIG. 8 is a perspective view of a second exemplary assembly of the thermal probe with a probe fitting according to the present disclosure.
Figure 9:
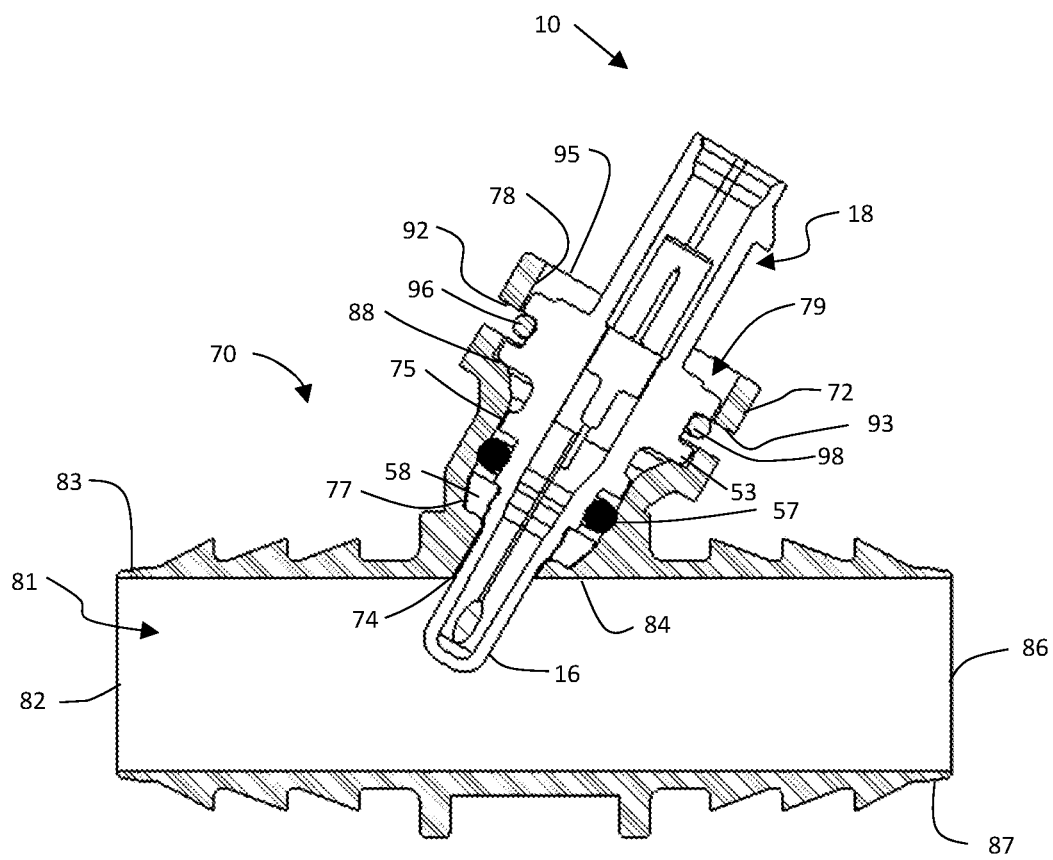
FIG. 9 is a longitudinal sectional view of the second exemplary embodiment of FIG. 8 according to the present disclosure.

As is illustrated in FIGS. 8 and 9 the probe receptacle 71 can be mounted at any desirable angle in probe fitting 70. In this second exemplary assembly, the probe receptacle 71' is arranged on probe fitting 70 at an angle between 10-30 degrees to the axial orientation of the fitting 70. This angular orientation has advantages in allowing the thermal probe 10 to be installed in installations where other system components prevent the assembly and disassembly of the thermal probe 10 into probe receptacle 71'. The thermal probe 10 is arranged to be installed and de-installed within probe receptacle 71' in the same manner as was explained above for FIGS. 5-7.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A thermal probe for sensing a temperature, comprising;
    a temperature sensing assembly producing a resistance which varies with the temperature;
    a connector assembly connected to the temperature sensing assembly adapted to transmit the resistance to external circuitry; and
    a non-metallic housing incasing the temperature sensing assembly and the connector assembly; and
    a receptacle including a top hat portion having a shoulder formed within a receiving cavity of the top hat portion and an exterior wall having first and second slots located on opposing sides extending through the exterior wall, the receptacle adapted to receive the temperature sensing assembly through the top hat portion and position the sensor assembly to sense the temperature.

2. The thermal probe of claim 1, wherein the housing includes:
    an internal cavity extending from an opening through the housing;
    a connector portion surrounding the connector assembly and exposed to the opening, the connector portion adapted to receive an electrical connector through the opening connecting the connector assembly to the external circuitry; and
    a sensor portion formed in the cavity opposite the connector portion inclosing the temperature sensing assembly.

3. The thermal probe of claim 2, wherein the temperature sensing assembly includes a temperature sensing device that produces the resistance that varies with the temperature and first and second leads that communicates the resistance.

4. The thermal probe of claim 3, wherein the connector assembly includes:
    a terminal base and first and second electrical terminals extending through the terminal base, the first terminal electrically connected to the first lead of the temperature sensing device and the second terminal electrically connected to the second lead of the temperature sensing device; and
    the terminal base adapted to be installed in the housing internal cavity between the connector portion and the sensor portion isolating the sensor portion from the connector portion.

5. The thermal probe of claim 4, wherein the housing internal cavity includes:
    stop surfaces extending into the internal cavity from cavity walls; and
    the terminal base including side walls slightly larger than the cavity walls that adjoin the stop surfaces;
    wherein the terminal base is installed on the stop surfaces with the side walls of the terminal base causing a friction fit with the cavity walls sealing the sensor portion from the connector portion.

6. The thermal probe of claim 3, wherein the temperature sensing device includes a thermistor.

7. The thermal probe of claim 3, wherein the temperature sensing device includes a negative thermal coefficient device.

8. The thermal probe of claim 3, wherein the temperature sensing device includes a positive thermal coefficient device.

9. The thermal probe of claim 3, wherein the sensor portion cavity is filled with a thermally conductive potting compound that incapsulates the temperature sensing device and the first and second leads.

10. The thermal probe of claim 1, wherein the housing is formed as a one-piece non-metallic, liquid resistant casing.

11. An assembly of a thermal probe and a probe fitting for measuring the temperature of a fluid medium flowing in a passage of the probe fitting, the assembly comprising;
    a temperature sensing assembly producing a resistance which varies with the temperature;
    a connector assembly connected to the to-the temperature sensing assembly adapted to transmit the resistance to external circuitry;
    a non-metallic housing having a sensor portion incasing the temperature sensing assembly and a connector portion housing the connector assembly; and
    a probe receptacle attached to the probe fitting, the probe receptacle including a cylindrical top hat portion having an annular shoulder formed within an interior cavity of the top hat portion and an exterior wall having first and second slots located on opposing sides extending through the exterior wall, the probe receptacle adapted to severably receive the sensor portion of the housing, positioning the temperature sensing assembly in the passage to sense the temperature of the fluid medium flowing in the passage.

12. The assembly of claim 11, wherein the thermal probe further includes:
    a mounting assembly comprising an upper flange member and a lower flange member extending perpendicularly from the sensor portion of the housing and defining an annular channel between the upper and lower flange members.

13. The assembly of claim 12, wherein the thermal probe further includes:

a seal element located circumferentially about an outer surface of the sensor portion of the housing.

14. The assembly of claim 13, wherein the thermal probe further includes: an internal cavity extending from an opening through the housing to a sensor tip;
   the connector portion exposed to the opening and arranged to receive an electrical connector through the opening connecting the connector assembly to the external circuitry; and
   the sensor assembly including a temperature sensitive device located in the cavity within the sensor tip arranged to produce the resistance that varies with the temperature and first and second leads that communicate the resistance.

15. The assembly of claim 14, wherein the thermal probe further includes: a terminal base and first and second electrical terminals extending through the terminal base, the first terminal electrically connected to the first lead of the temperature sensing device and the second terminal electrically connected to the second lead of the temperature sensing device the first and second electrical terminals connecting the resistance produced by the temperature sensitive device to the electrical connector and the external circuitry; and
   the terminal base adapted to be installed in the housing cavity between the connector portion and the sensor portion isolating the sensor portion from the connector portion.

16. The assembly of claim 14 wherein the probe receptacle includes:
   a cylindrical bottom portion integrally attached between the top hat portion and to the probe fitting; and
   the interior cavity extends through the probe receptacle from the a top hat opening through the bottom portion to a hole that extends through the probe fitting into the passage.

17. The assembly of claim 16 wherein the thermal probe is installed in the probe receptacle through the top hat opening into the interior cavity, the sensor portion of the thermal probe extending into the bottom portion of the probe receptacle with the sensor tip extending through the hole and the sealing element sealingly engaged to the interior cavity.

18. The assembly of claim 17, wherein a bottom surface of the thermal probe lower flange rests on the shoulder of the top hat portion when the sensor tip extends through the hole, aligning the first and second slots of the top hat portion with the channel of the thermal probe mounting assembly, the channel accepting a first and a second leg of a locking clip installed through the first and second slots respectively, locking the thermal probe to the probe receptacle.

19. The assembly of 18, wherein the thermal probe is removed from the probe receptacle by removing the first and the second legs of the locking clip from the channel of the thermal probe mounting assembly and pulling the thermal probe out of the probe receptacle through the top hat opening.

* * * * *